United States Patent
Dou et al.

(10) Patent No.: US 6,391,822 B1
(45) Date of Patent: May 21, 2002

(54) DUAL NO$_X$ ADSORBER CATALYST SYSTEM

(75) Inventors: Danan Dou, Tulsa; Owen H. Bailey, Claremore, both of OK (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/500,615

(22) Filed: Feb. 9, 2000

(51) Int. Cl.$^7$ ............... B01J 23/00; B01J 23/40; B01J 23/58; B01J 23/42

(52) U.S. Cl. ............... 502/325; 502/326; 502/328; 502/330; 502/339

(58) Field of Search ............... 502/325, 326, 502/328, 330, 339, 340, 344; 423/213.5

(56) References Cited

U.S. PATENT DOCUMENTS

| | | | |
|---|---|---|---|
| 4,024,706 A | | 5/1977 | Adawi et al. |
| 4,199,938 A | | 4/1980 | Nakase et al. |
| 5,041,407 A | * | 8/1991 | Williamson et al. ....... 502/303 |
| 5,116,800 A | * | 5/1992 | Williamson et al. ....... 502/303 |
| 5,313,792 A | | 5/1994 | Katoh et al. |
| 5,412,945 A | * | 5/1995 | Katoh et al. .......... 60/285 |
| 5,427,989 A | * | 6/1995 | Kanesaka et al. ........ 502/66 |
| 5,459,119 A | * | 10/1995 | Abe et al. ............ 502/326 |
| 5,461,857 A | * | 10/1995 | Itou et al. ............ 60/276 |
| 5,531,972 A | * | 7/1996 | Rudy .................. 423/212 |
| 5,577,383 A | | 11/1996 | Kuroda et al. |
| 5,609,026 A | | 3/1997 | Berriman et al. |
| 5,623,824 A | | 4/1997 | Yukawa et al. |
| 5,744,111 A | * | 4/1998 | Muramatsu et al. ....... 423/235 |
| 5,753,580 A | * | 5/1998 | Hayashi et al. ......... 502/304 |
| 5,756,057 A | * | 5/1998 | Tsuchitani et al. ...... 423/213.2 |
| 5,829,250 A | | 11/1998 | Lane et al. |
| 5,849,254 A | * | 12/1998 | Suzuki et al. .......... 423/213.5 |
| 5,948,376 A | * | 9/1999 | Miyoshi et al. ......... 423/213.5 |
| 5,968,462 A | * | 10/1999 | Suzuki ................ 423/213.2 |
| 5,968,870 A | * | 10/1999 | Iizuka et al. .......... 502/325 |
| 5,990,038 A | * | 11/1999 | Suga et al. ............ 502/303 |
| 6,010,673 A | * | 1/2000 | Kanazawa et al. ....... 423/213.5 |
| 6,047,544 A | * | 4/2000 | Yamamoto et al. ....... 60/285 |
| 6,093,378 A | * | 7/2000 | Deeba et al. ........... 423/213.5 |
| 6,165,429 A | * | 12/2000 | Ikeda et al. ........... 423/213.5 |
| 6,182,443 B1 | * | 2/2001 | Jarvis et al. .......... 60/274 |
| 6,214,307 B1 | * | 4/2001 | Okumura et al. ........ 423/213.5 |
| 6,251,820 B1 | * | 6/2001 | Tsuji .................. 502/242 |

FOREIGN PATENT DOCUMENTS

| | | | |
|---|---|---|---|
| EP | 0582917 A1 | * | 2/1994 |
| EP | 0645173 | | 3/1995 |
| EP | 0857510 A1 | * | 8/1998 |

* cited by examiner

Primary Examiner—Steven P. Griffin
Assistant Examiner—Cam N. Nguyen
(74) Attorney, Agent, or Firm—Vincent A. Cichosz (57) ABSTRACT

A NO$_x$ adsorber catalyst system for treatment of gases in an exhaust discharge passage of an internal combustion engine comprising: a first adsorber catalyst supporting effective amounts of at least one noble metal component and a Ba component; and, a second adsorber catalyst supporting effective amounts of at least one noble metal catalyst, a Ba component, and a K component.

24 Claims, 14 Drawing Sheets

DUAL $NO_x$ ADSORBER CATALYST SYSTEM

TECHNICAL FIELD

The invention relates to $NO_x$ adsorber catalyst systems for reduction of the amount of hydrocarbons, carbon monoxide, and nitrogen oxides in automotive exhaust gases from lean burn and direct injection gasoline engines, and, more particularly, a trimetallic catalyst system for improved performance.

BACKGROUND OF THE INVENTION

In order to meet government mandated exhaust gas emission standards, the exhaust gases of an automotive internal combustion engine must be treated before emission into the atmosphere. Typically, exhaust gases are routed through a catalytic converter device disposed in the exhaust outlet system of the engine, where the gases are treated by reactions with a catalyst deposited on a porous support material. The exhaust gases generally contain undesirable emission components including carbon monoxide (CO), hydrocarbons (HC), and nitrogen oxide ($NO_x$). As a means of simultaneously removing the objectionable CO, HC, and $NO_x$ components, various "three-way" catalysts have been developed. Such catalysts typically employ one or more noble metals such as platinum (Pt), palladium (Pd), and rhodium (Rh), disposed on an alumina support. Other metals and metal oxides may also be included. Additional promoters such as rare earths, in particular cerium (Ce) and lanthanum (La), as well as alkaline-earth metals, such as barium (Ba) have been suggested to improve catalyst performance.

The need for fuel economy and the reduction of carbon dioxide ($CO_2$) emissions now have made it generally desirable to operate internal combustion engines under "lean-burn" and direct injection conditions. Under lean-burn conditions, the air-to-fuel ratio is adjusted to be somewhat greater than the stoichiometric ratio (about 14.7), generally between about 19 and about 35, in order to realize a fuel economy benefit. However, when operating under lean-burn conditions, typical three-way catalyst systems are efficient in oxidizing unburned HC and CO, but are inefficient in reducing $NO_x$ emission components.

One approach for treating nitrogen oxides in exhaust gases of engines operating under lean-burn conditions has been to incorporate $NO_x$ adsorbers in exhaust lines along with three-way catalysts. Such $NO_x$ adsorbers need to be able to operate within a wide temperature window of $NO_x$ control, while functioning as an effective three-way catalyst featuring good light-off as well as HC, CO, and $NO_x$ conversion performances. These adsorbers generally comprise a catalytic metal, which typically is platinum alone or which often further includes palladium and rhodium, in combination with an alkali or alkaline earth element or combinations thereof. The catalytic material in the adsorber acts first to oxidize NO to $NO_2$; $NO_2$ then reacts with the alkali and alkaline earth materials to form stable nitrate salts. In a stoichiometric or rich environment, the nitrate is thermodynamically unstable, and the stored $NO_x$ is released for catalysis, whereupon $NO_x$ is reduced to $N_2$ gas.

The catalyst materials are typically loaded onto a washcoat, e.g. a porous support material suitable for use in high temperature environments. As is common in the art, suitable washcoat materials are high surface area materials like alumina, gamma-alumina, zirconia, cerium oxide (ceria), and magnesium oxide, among others. For practical incorporation of the washcoat materials and the catalytic materials into internal combustion engine exhaust systems, the washcoat will, itself, be deposited on a chemically stable substrate material. Particularly useful substrate materials, as are commonly used for washcoat deposition, include cordierite and mullite, among others. The substrate may be of any size or shape, such as is required by the physical dimensions of the designed exhaust system. Similarly, the internal configuration of the substrate may be any known or commonly employed configuration. Substrates are typically formed as monolithic honeycomb structures, layered materials, or spun fibers, among other configurations.

However, there continues to be a need to develop a $NO_x$ adsorber catalyst system to provide effective exhaust gas treatment over the range of internal combustion engine operating conditions. Catalyst formulations including a Ba component, along with noble metals such as Pt and Rh, are reported to display favorable fresh and aged $NO_x$ adsorption performance at exhaust gas temperatures less than about 400° C. However, these formulations disadvantageously appear to exhibit poor $NO_x$ treatment performance at higher operating temperatures (e.g., greater than about whether the catalyst formulation is fresh or aged.

It further is known that $KNO_3$ thermodynamically is more stable than $Ba(NO_3)_2$. Accordingly, it has been proposed to incorporate K into a catalyst formulation, and, as expected, the addition of K serves significantly to improve high temperature $NO_x$ adsorption performance. Unfortunately, K also is known to deactivate noble metal catalyst components, and, as a result thereof, the incorporation of K into a $NO_x$ adsorber catalyst formulation negatively affects the noble metal activity. For example, light off characteristics of typical Pt and Rh components are detrimentally affected; and, in general, HC reduction performance of the catalyst formulations is adversely impacted.

SUMMARY OF THE INVENTION

Now, an improved $NO_x$ adsorber catalyst system has been developed for treatment of gases in an exhaust discharge of an internal combustion engine. It unexpectedly has been found that a catalyst system comprising a novel dual $NO_x$ adsorber catalyst system affords the advantages of the individual catalyst formulations of each $NO_x$ adsorber formulation, while minimizing the disadvantages of each individual formulation. This dual $NO_x$ adsorber catalyst system serves to optimize the $NO_x$ operating temperature window, HC performance, and catalyst light-off performance, as well as system sulfur release performance.

According to the present invention, a dual $NO_x$ adsorber catalyst system is employed, wherein a first adsorber catalyst formulation comprises effective amounts of a Ba component along with at least one noble metal component. The noble metal component(s) preferably is selected from the group consisting of Pt, Pd, and Rh. A second adsorber catalyst formulation is employed comprising effective amounts of both a Ba and a high temperature $NO_x$ adsorbent component along with at least one noble metal component. The high temperature $NO_x$ adsorbent component preferably is selected from the group consisting of Na, Cs, and K components; a K component is particularly preferred. Preferably, the noble metal component(s) is selected from the group consisting of Pt, Pd, and Rh. The amount of Ba component in the first and second catalyst formulations generally ranges from about 180 to about 2904 g/ft³, preferably about 363 to about 1452 g/ft³. The amount of high temperature $NO_x$ adsorbent component in the second catalyst formulation generally ranges from about 70 to about 1104 g/ft$^3$, preferably about 138 to about 552 g/ft$^3$. In regard to the noble metal components, in the first catalyst formulation Pt generally ranges from about 30 to 150 g/ft$^3$, preferably about 50 to 110 g/ft$^3$; Pd generally ranges from about 10 to about 80 g/ft$^3$, preferably about 20 to about 80 g/ft$^3$; Rh generally ranges from about 3 to about 30 g/ft$^3$, preferably about 3 to about 15 g/ft$^3$. In the second catalyst formulation, Pt generally ranges from about 20 to about 150 g/ft$^3$, preferably about 50 to about 110 g/ft$^3$; Pd generally ranges from about 10 to about 80 g/ft$^3$; preferably about 10 to about 50 g/ft$^3$; Rh generally ranges from about 3 to about 30 g/ft$^3$, preferably about 5 to about 15 g/ft$^3$.

The combination of a catalyst formulation with Ba, featuring good catalyst light-off characteristics and favorable low temperature NO$_x$ adsorption performance, with a Ba and K containing catalyst formulation, featuring good high temperature NO$_x$ adsorber performance, accomplishes a catalyst system with overall performance which cannot be achieved by either of the technologies individually.

Preferably, the first catalyst formulation comprises a Ba component and at least two noble metal components. More preferably, the first catalyst formulation is a trimetallic catalyst formulation. In particular, it is preferred that the first catalyst formulation comprise a Ba component, along with Pt, Rh, and Pd components. The Ba component preferably is in the form of BaCO$_3$, BaO, or other active forms of Ba.

It is believed that the incorporation of a Pd component into the Ba catalyst formulation further serves to improve fresh, and more importantly, aged low temperature NO$_x$ adsorber performance, as well as stoichiometric light-off. Accordingly, a preferred first catalyst formulation comprises Ba, Pt, Rh, and Pd.

Preferably, the second catalyst formulation comprises a K component, a Ba component, and at least two noble metal catalyst components. More preferably, the second catalyst formulation is a trimetallic catalyst formulation. In particular, it is preferred that the second catalyst formulation comprise a Ba component and a K component along with a Pt component, and an Rh component, and a Pd component. The Ba component preferably is in the form of BaCO$_3$, BaO, or other active forms of Ba; the K component preferably is in the form of K$_2$CO$_3$, K$_2$O, or other active forms of K. It is believed that the further incorporation of Pd into this Ba and K containing trimetallic catalyst formulation serves to improve low temperature NO$_x$ performance, as well as improve the HC removal performance of the catalyst.

As discussed above, the incorporation of K into a NO$_x$ adsorber catalyst formulation is understood to result in poisoning deactivation of the noble metal catalyst components. Accordingly, the separation of a two adsorber catalyst system pursuant to the present invention serves to avoid poisoning impact on the first adsorber catalyst which does not contain K. To avert possible migration of K from the second K-containing catalyst adsorber to the first adsorber catalyst, it is preferred that the second adsorber catalyst be located in the exhaust gas outlet system at a point downstream of the first adsorber catalyst which contains Ba but no K. The upstream Ba-containing catalyst also serves the beneficial purpose of acting as a sulfur trap for the second adsorber catalyst, since BaSO$_4$ is thermodynamically less stable than K$_2$SO$_4$, and trapped sulfur can be released under less severe conditions.

BRIEF DESCRIPTION OF THE DRAWINGS

For a further understanding of the nature of the present invention, as well as other features and advantages thereof, reference should be made to the following description taken in conjunction with the accompanying graphs. In the graphs, where it is noted that the catalyst is aged, aging is accomplished by stoichiometric closed loop operation for 6 minutes, then 5 minutes of stoichiometric operation with a fuel cut each minute with increasing duration (2, 3, 4, and 5 seconds). Inlet temperature (T) is 750° C. unless specified otherwise. Lean/rich modulation with 500 ppm NO$_x$ concentration is performed at an air/fuel ratio (A/F)=21.5 for 30 seconds|A/F=12.5 for 1.67 seconds to evaluate NO$_x$ adsorber catalyst performance. Desulfurization (De-S) is performed at A/F=14.56 for 7 min, A/F=13.5 for 3 min at 700° C. Sulfur poisoning aging is conducted at 500° C. inlet temperature with 150 ppm fuel sulfur level and 30 seconds lean and 2 seconds rich modulation. The loadings of catalyst components in the catalyst formulations reported in the examples are as follows: Ba (1389 g/ft$^3$); K (276 g/ft$^3$); Pd (43 g/ft$^3$); Pt (110 g/ft$^3$); Rh (11 g/ft$^3$).

DESCRIPTION OF THE PREFERRED EMBODIMENT

Figure 1:
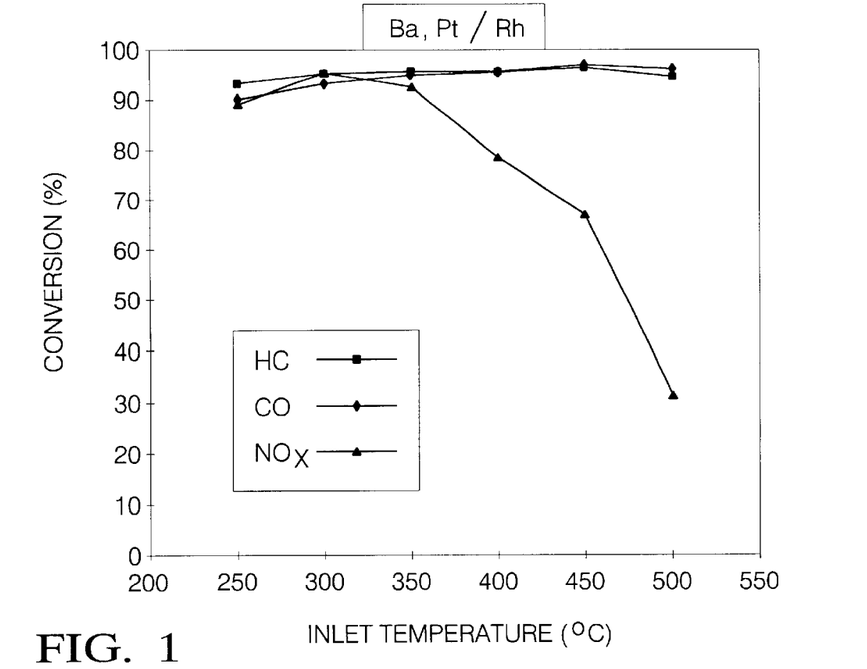
FIG. 1 is a graph depicting the HC, CO, and NO$_x$ conversion performance of a fresh NO$_x$ adsorber catalyst formulation containing Ba along with Pt and Rh components.
Figure 2:
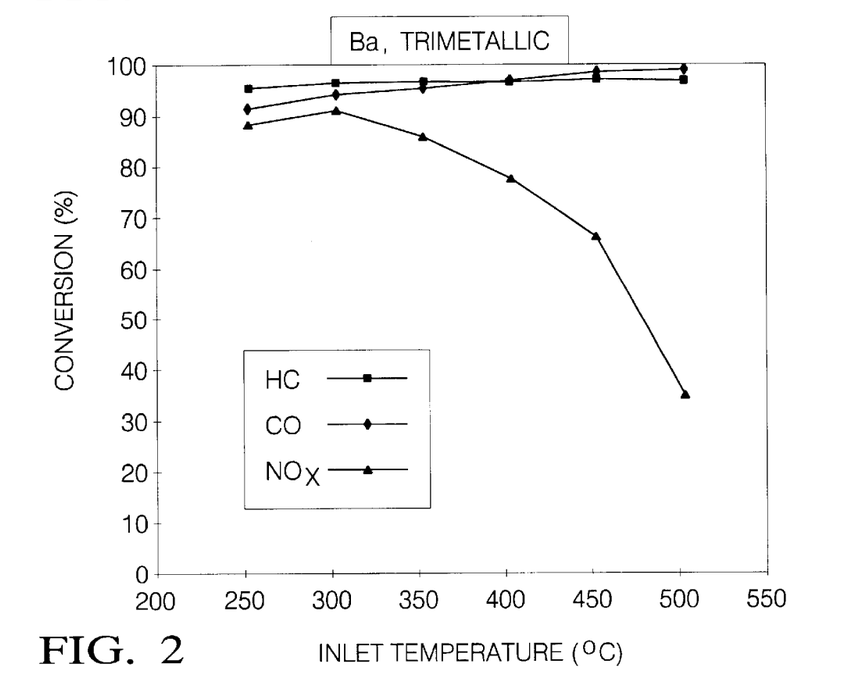
FIG. 2 is a graph depicting the HC, CO, and NO$_x$ conversion performance of a fresh trimetallic catalyst formulation containing Ba along with Pt, Rh, and Pd.

Referring now to FIG. 1, this graph depicts the performance of a fresh, $NO_x$ adsorber catalyst containing a Ba component along with noble metal components of Pt and Rh. As reported in the graph, the performance of the catalyst in regard to $NO_x$ adsorption is deficient at high temperatures (above about 400° C.). Trimetallic three-way catalysts containing Pt, Rh, and Pd, along with a Ba component similarly are characterized by a high temperature $NO_x$ conversion deficiency, as shown in the graph of FIG. 2.

Figure 3:
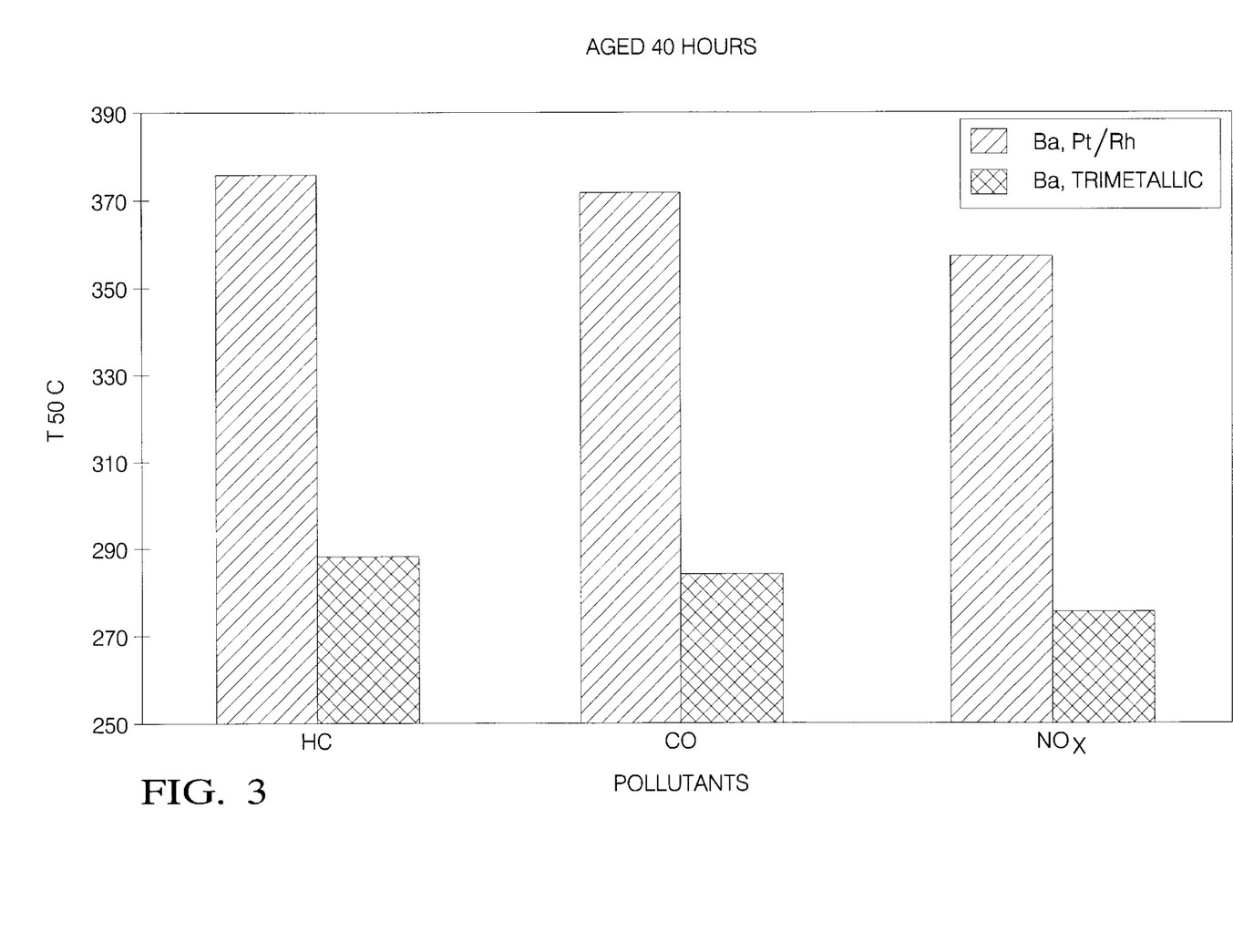
FIG. 3 is a graph showing a comparison of catalyst three-way light-off activity between an aged NO$_x$ adsorber catalyst containing Ba along with Pt, Rh, and Pd, and a NO$_x$ adsorber catalyst containing Ba along with Pt and Rh.

Incorporation of Pd into a catalyst formulation containing Pt, Rh along with Ba does however significantly enhance catalyst light-off. This enhancement is represented by the bar graph of FIG. 3 which shows a comparison of light-off performance of an aged Ba, Pt/Rh catalyst with an aged Ba trimetallic (Pt/Rh/Pd) catalyst.

Figure 4:
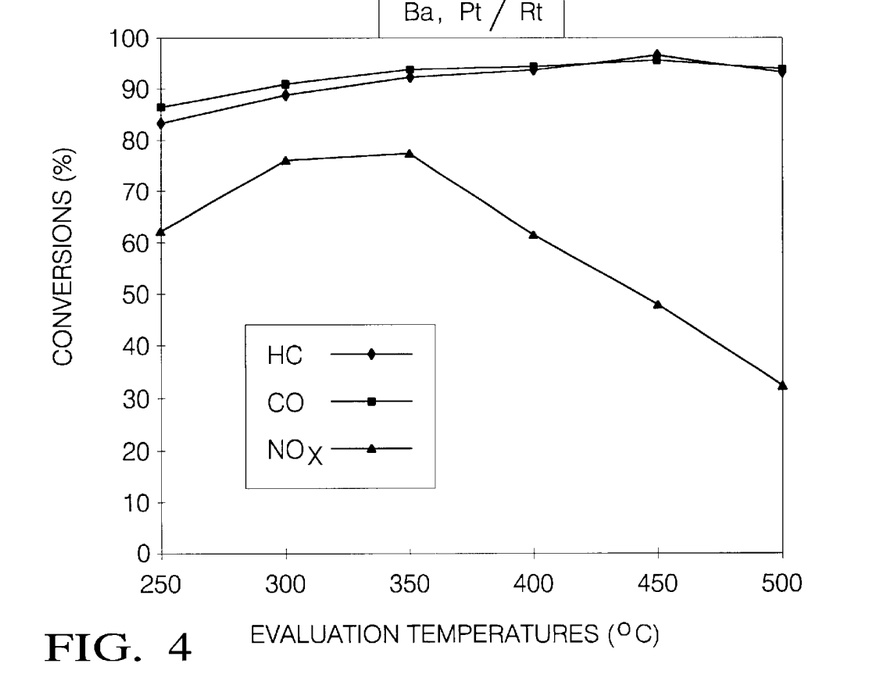
FIG. 4 is a graph depicting the HC, CO, and NO$_x$ conversion performance of a fresh NO$_x$ adsorber catalyst formulation containing Ba along with Pt and Rh components.
Figure 5:
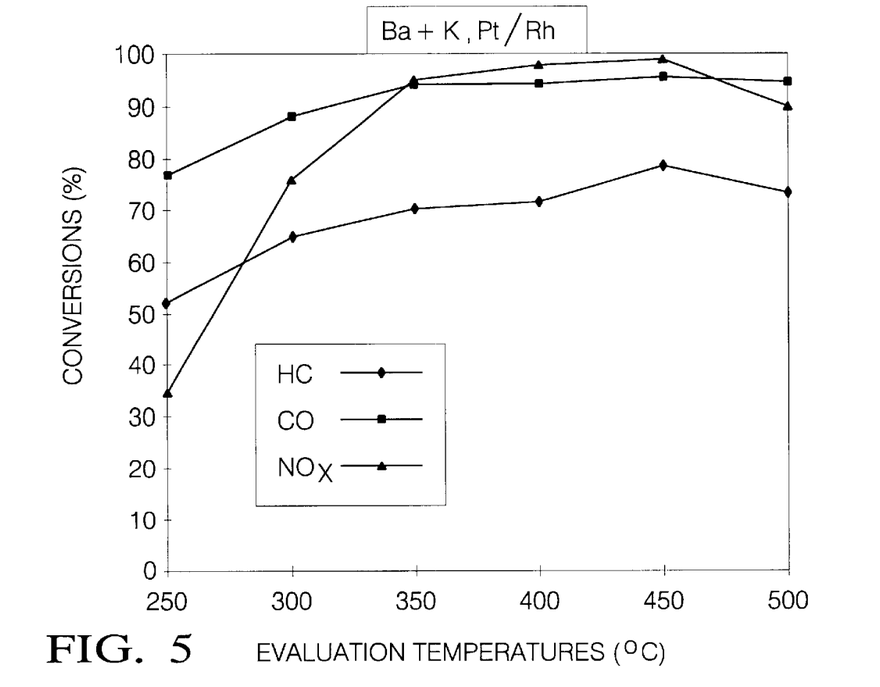
FIG. 5 is a graph depicting the HC, CO$_2$, and NO$_x$ conversion performance of a fresh NO$_x$ adsorber catalyst formulation containing Ba and K along with Pt and Rh.

Since $KNO_3$ is thermodynamically more stable than $Ba(NO_3)_2$, the addition of K to a Ba containing three-way catalyst would be expected to improve high temperature $NO_x$ performance of the catalyst. This result is portrayed by comparison of the two graphs of FIGS. 4 and 5. FIG. 4 shows the HC, CO, and $NO_x$ conversion performances of a Pt/Rh based catalyst containing Ba alone; FIG. 5 shows the HC, CO, and $NO_x$ conversion performances of the same Pt/Rh based catalyst containing both Ba and K. Comparison of the graphs indicates that the incorporation of K into the catalyst formulation improves the high temperature $NO_x$ conversion performance, but does so at the expense of degrading low temperature $NO_x$ conversion and HC conversion.

Figure 6:
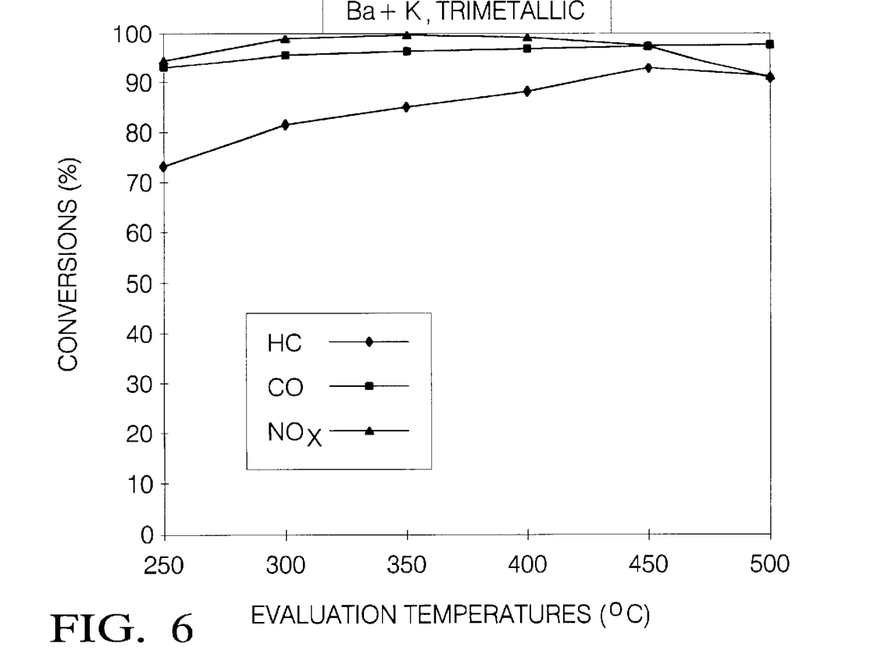
FIG. 6 is a graph demonstrating the HC, CO, and NO$_x$ conversion performance of a NO$_x$ adsorber catalyst containing Ba and K along with Pt, Rh, and Pd.
Figure 7:
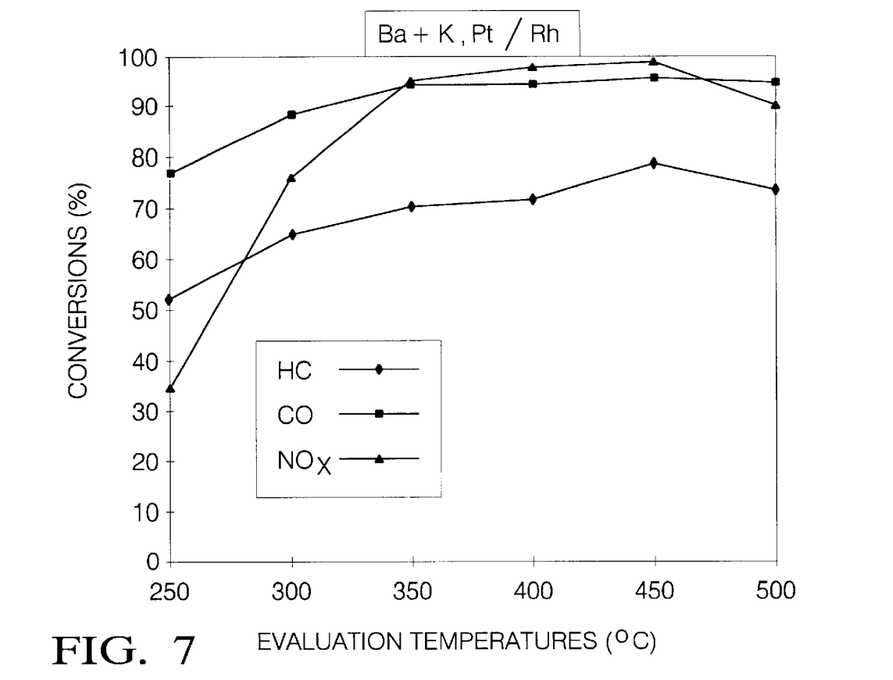
FIG. 7 is a graph demonstrating the low temperature NO$_x$ conversion performance of a fresh NO$_x$ adsorber catalyst containing Ba along with Pt and Rh.
Figure 8:
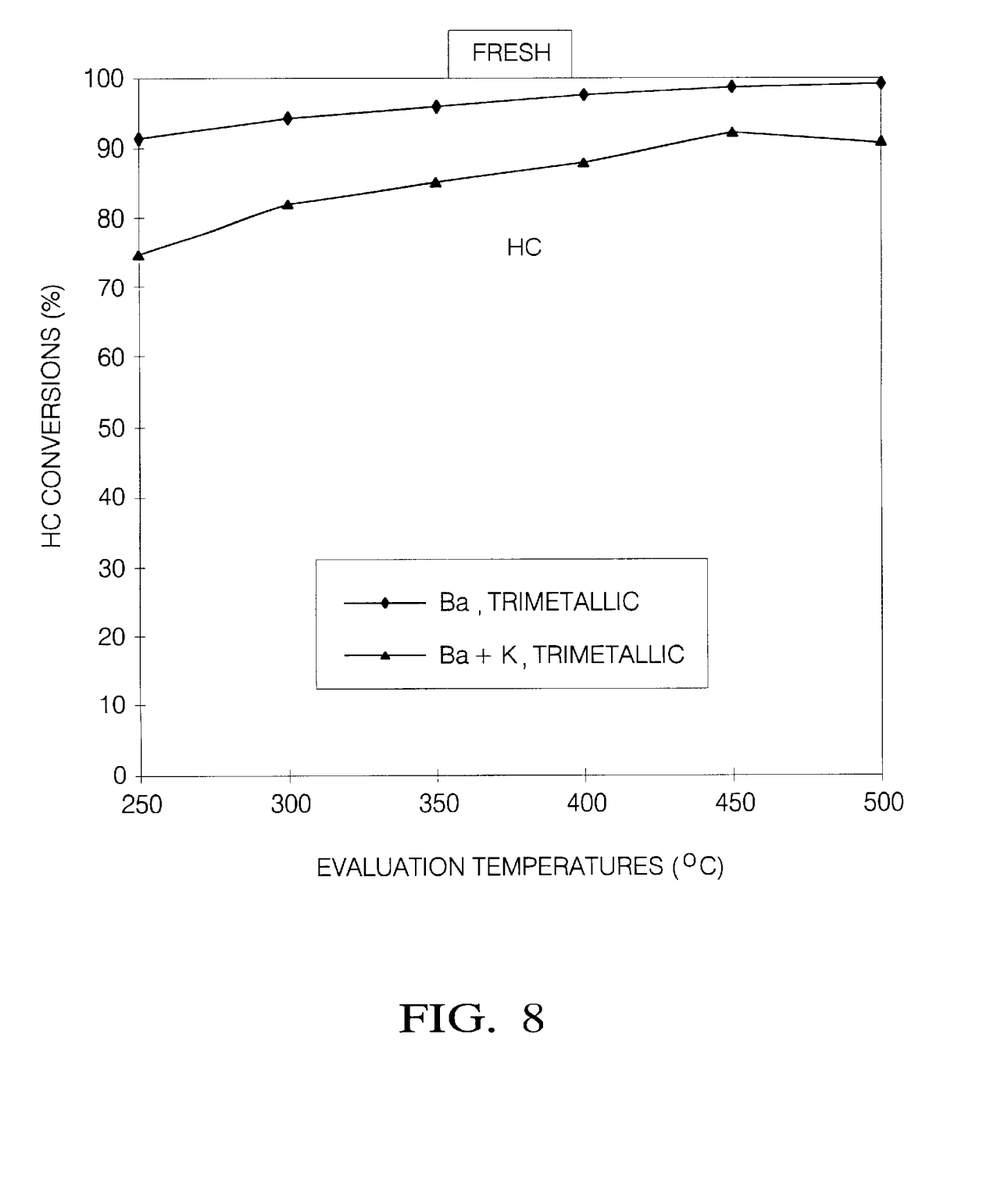
FIG. 8 is a graph showing the HC conversions of a fresh trimetallic NO$_x$ adsorber catalyst formulation containing Ba-only with a trimetallic NO$_x$ adsorber catalyst formulation containing Ba and K.
Figure 9:
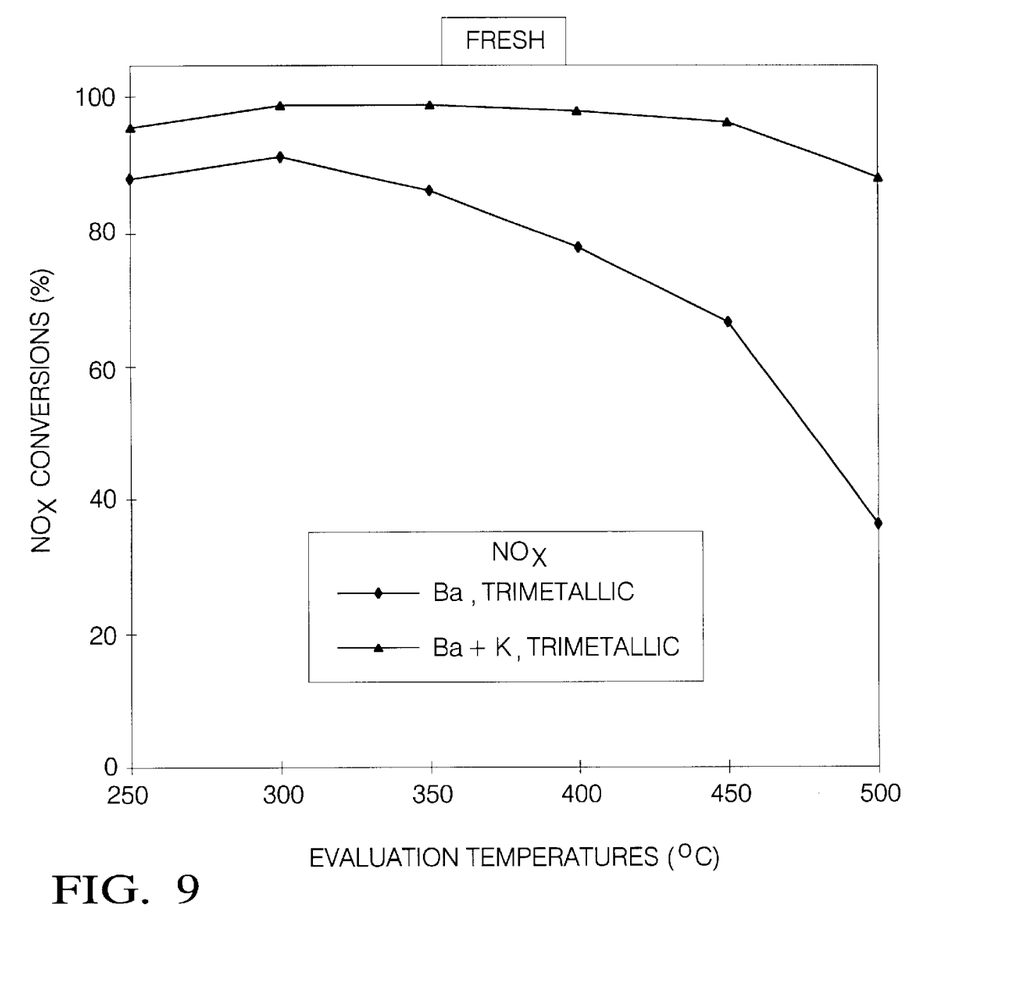
FIG. 9 is a graph showing the NO$_x$ conversions of a fresh trimetallic NO$_x$ adsorber catalyst formulation containing Ba-only with a trimetallic NO$_x$ adsorber catalyst formulation containing Ba and K.
Figure 10:
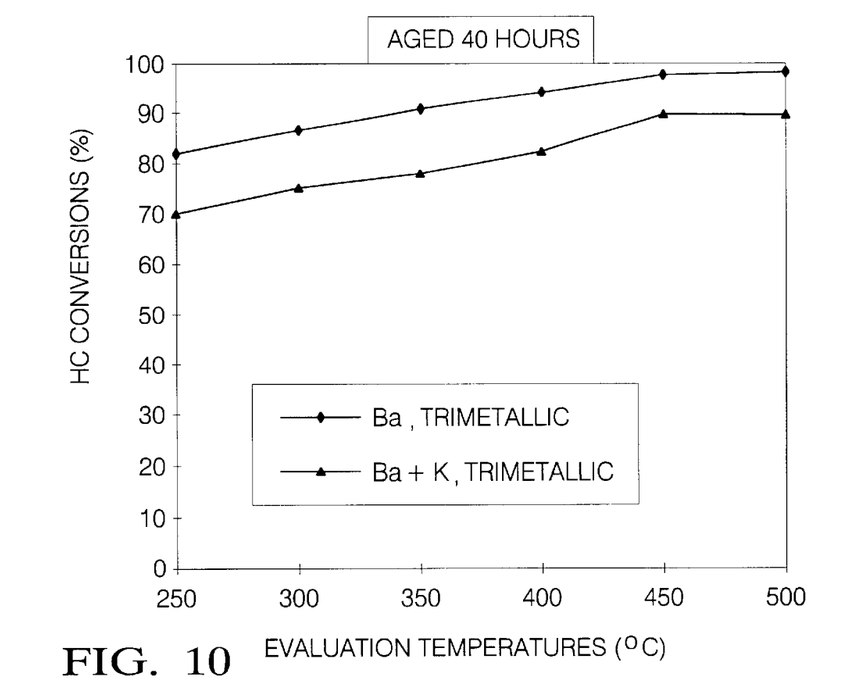
FIG. 10 is a graph showing HC conversion performance of an aged trimetallic NO$_x$ adsorber catalyst containing Ba and K as compared to a trimetallic NO$_x$ adsorber catalyst containing Ba only, under conditions of lean/rich modulation.
Figure 11:
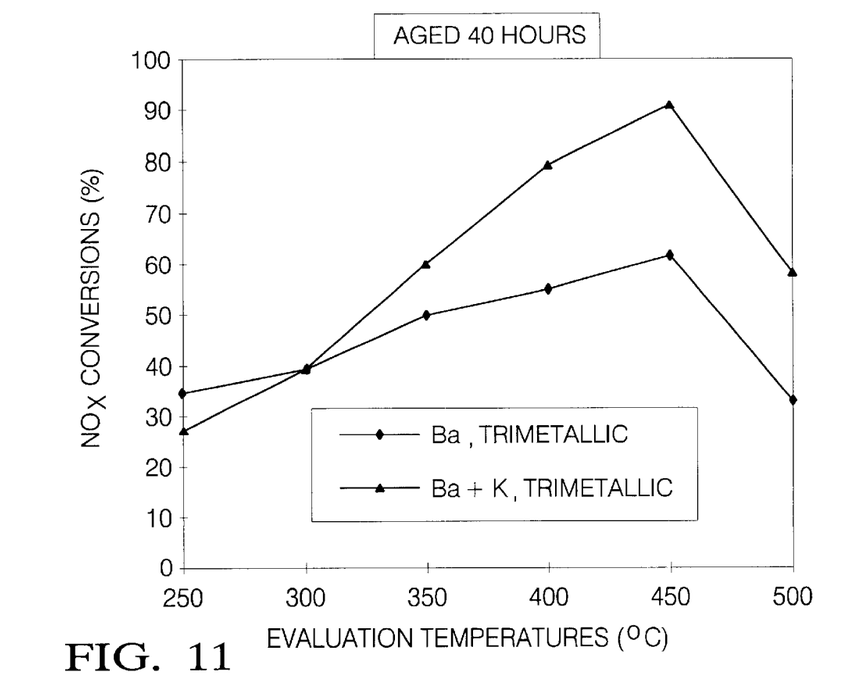
FIG. 11 is a graph showing the NO$_x$ conversion performance of an aged trimetallic NO$_x$ adsorber catalyst containing Ba and K as compared to a trimetallic NO$_x$ adsorber catalyst containing Ba only, under conditions of lean/rich modulation.

The further inclusion of Pd into Pt/Rh based catalyst containing both Ba and K succeeds in improving low temperature $NO_x$ performance of the resulting catalyst formulation, as well as improving the HC conversion performance of the catalyst. FIG. 6 depicts the performance of the Pd containing trimetallic adsorber catalyst as compared to the same catalyst without Pd as reported in the graph of FIG. 7. It is noted, however, while the trimetallic adsorber catalyst did feature enhanced $NO_x$ adsorption with the addition of K, it did have the penalty of lowered HC conversion performance. This is shown in the graphs of FIGS. 8 and 9, representing fresh catalyst performances. FIGS. 10 and 11 further depict that after aging, the Ba-only trimetallic catalyst has better HC conversions but inferior $NO_x$ conversions at high temperatures relative to the Ba and K trimetallic catalyst.

Figure 12:
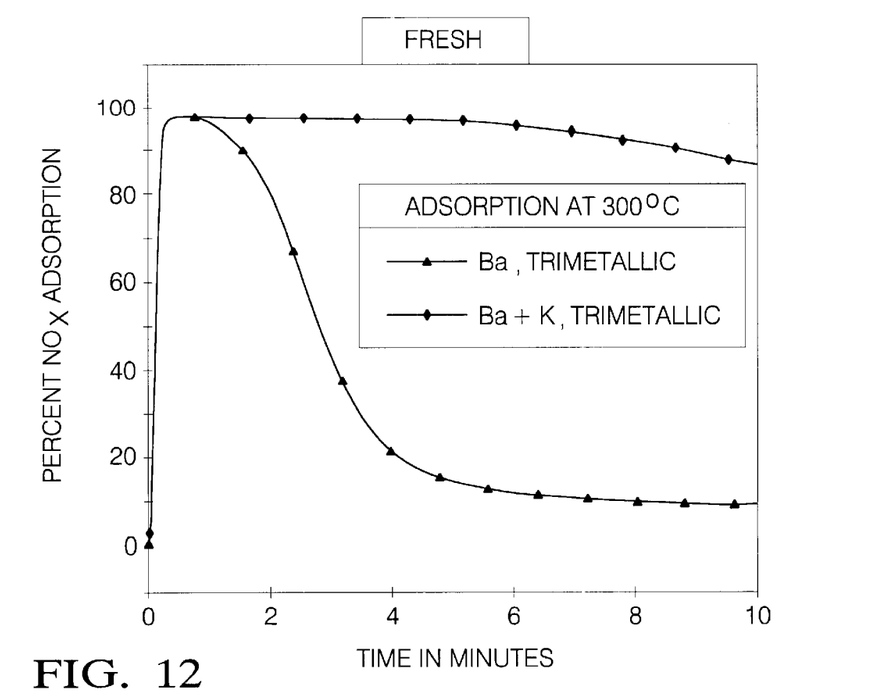
FIG. 12 is a graph showing NO$_x$ adsorption of a fresh trimetallic NO$_x$ adsorber catalyst containing Ba and K as compared to a trimetallic catalyst containing Ba only.
Figure 13:
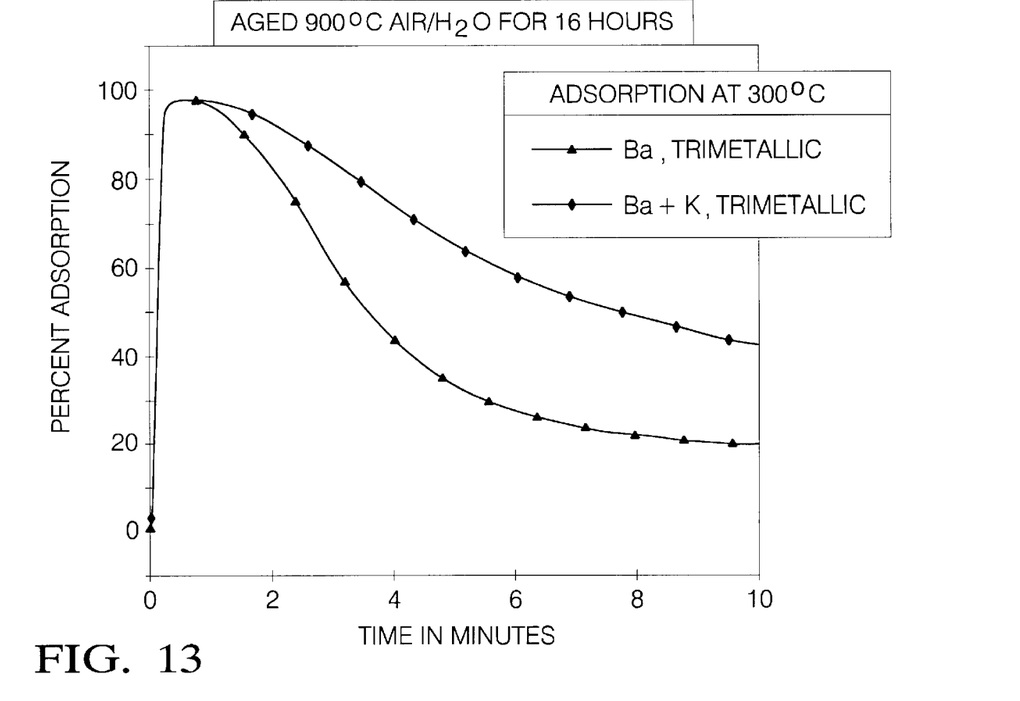
FIG. 13 is a graph showing NO$_x$ adsorption of an aged trimetallic catalyst containing Ba and K as compared to a trimetallic catalyst containing Ba only.

The graphs of FIGS. 12 and 13 serve to demonstrate that the inclusion of K into a trimetallic catalyst formulation containing Ba has the effect of enhancing the $NO_x$ trapping efficiency of the catalyst both when fresh and after aging.

Figure 14:
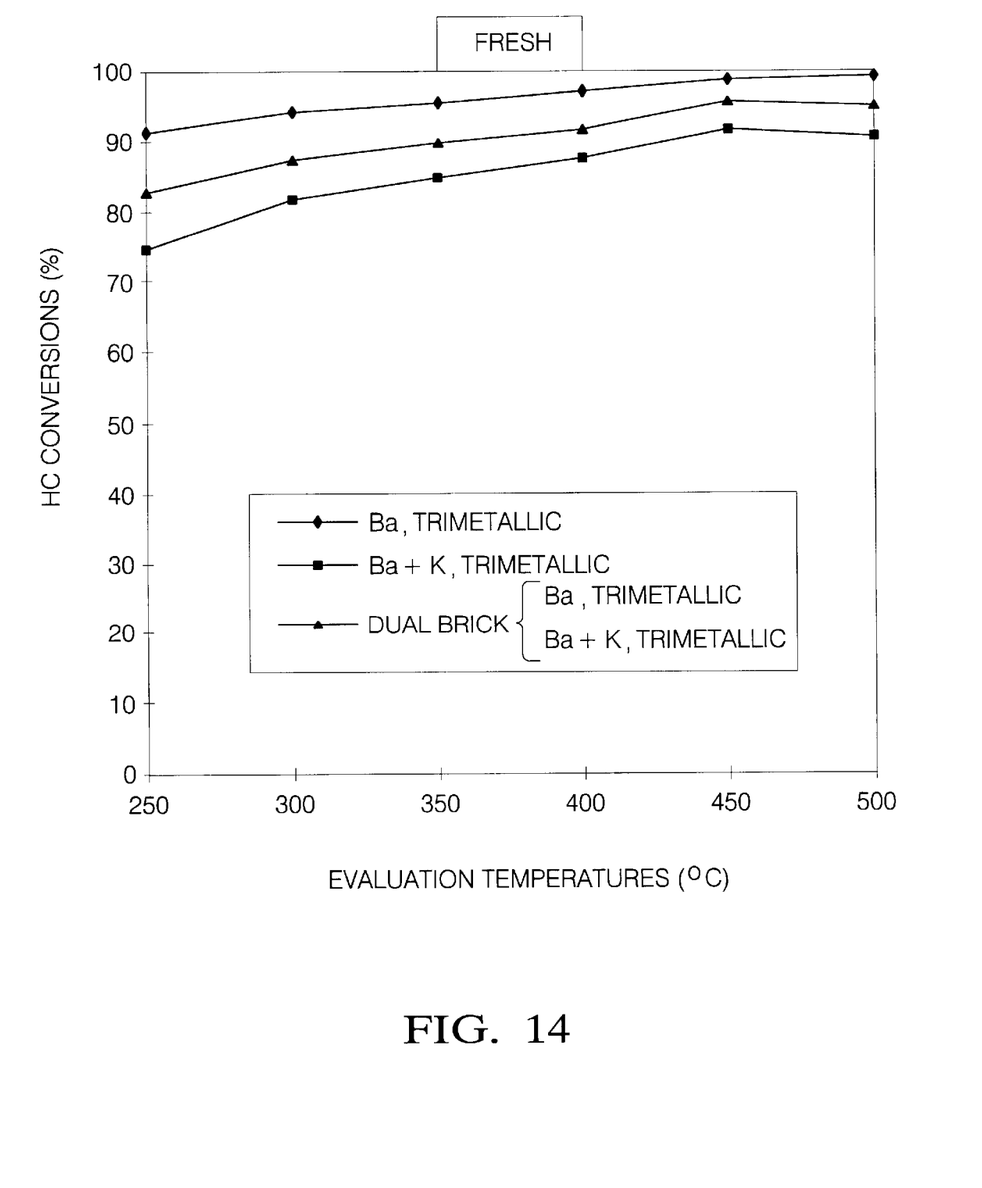
FIG. 14 is a graph illustrating improved HC conversion performance of a fresh two-adsorber catalyst system including a first trimetallic adsorber catalyst containing Ba and a second trimetallic adsorber catalyst containing Ba and K, as compared to a fresh single adsorber catalyst consisting of a trimetallic $NO_x$ adsorber catalysts containing Ba and K, or Ba only.
Figure 15:
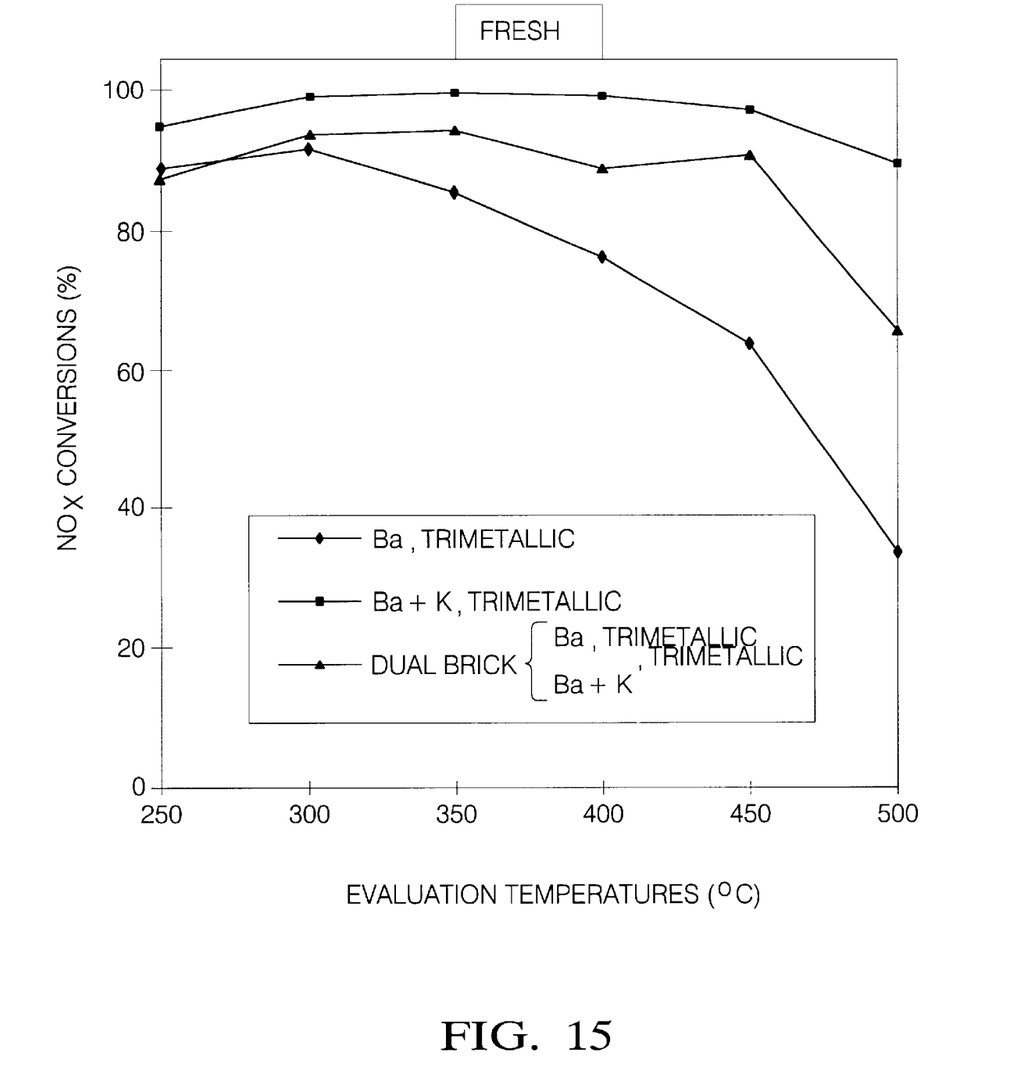
FIG. 15 is a graph illustrating improved high temperature $NO_x$ conversion performance of a fresh two-adsorber catalyst system including a first trimetallic adsorber catalyst containing Ba and a second adsorber trimetallic catalyst containing Ba and K, as compared to a fresh single adsorber catalyst consisting of a trimetallic catalyst containing Ba alone or Ba and K.
Figure 16:
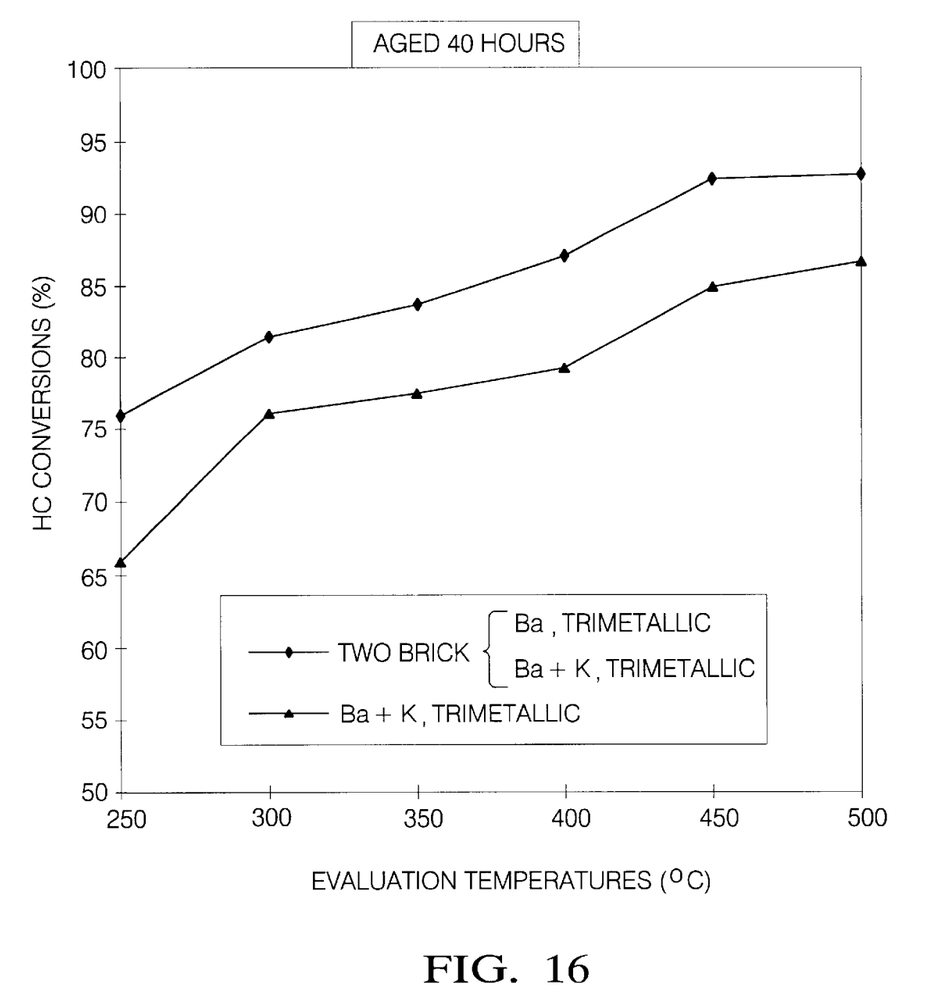
FIG. 16 is a graph depicting improved HC conversion performance of an aged two-adsorber catalyst system including a first trimetallic catalyst brick containing Ba and a second trimetallic adsorber catalyst containing Ba and K, as compared to an aged single adsorber catalyst consisting of a trimetallic catalyst containing Ba and K, under conditions of lean/rich modulation.
Figure 17:
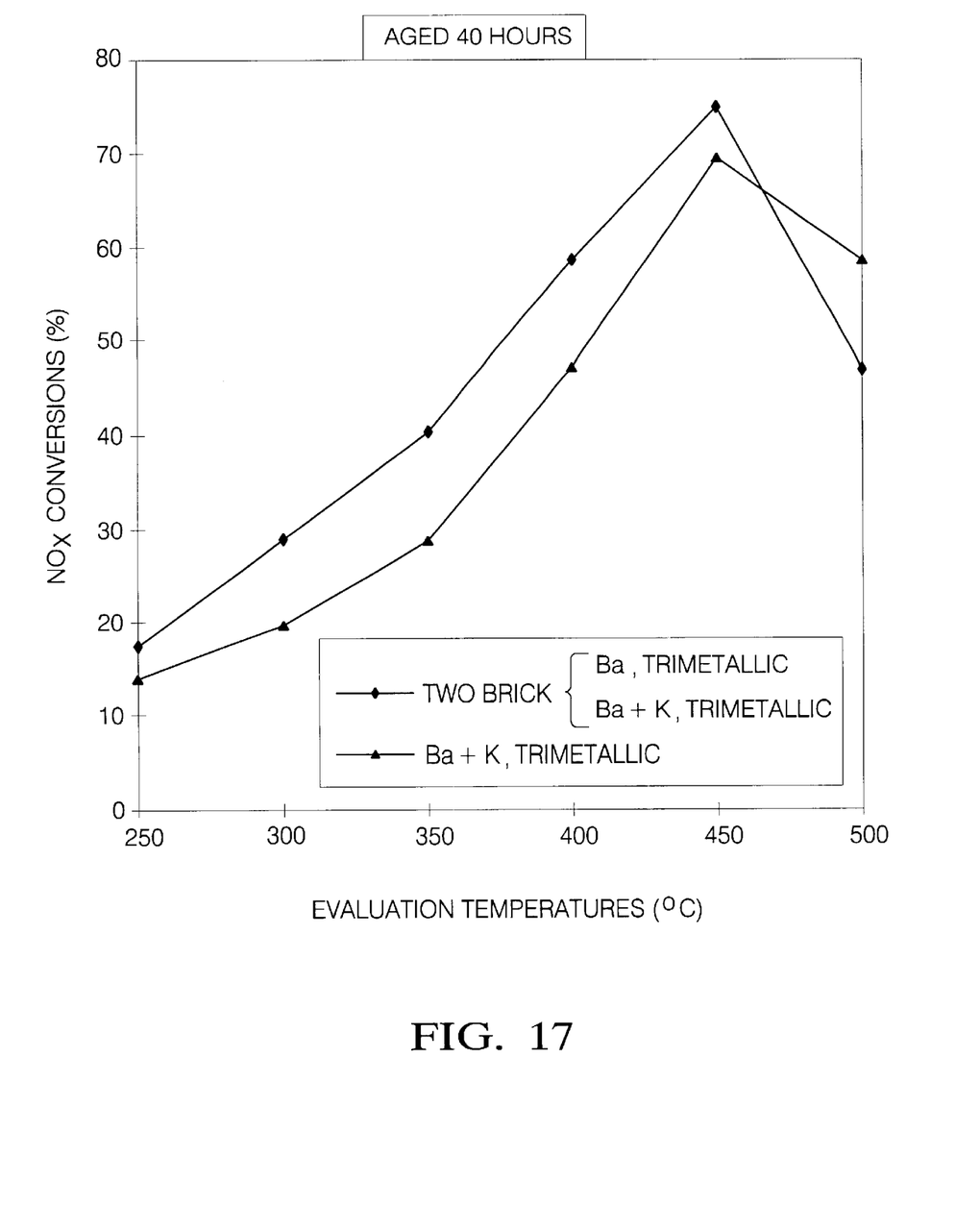
FIG. 17 is a graph depicting improved low temperature $NO_x$ conversion performance of an aged two-adsorber catalyst system including a first trimetallic adsorber catalyst containing Ba and a second trimetallic $NO_x$ adsorber catalyst containing Ba and K, as compared to an aged single adsorber catalyst consisting of a trimetallic $NO_x$ adsorber catalyst containing Ba and K, under conditions of lean/rich modulation.
Figure 18:
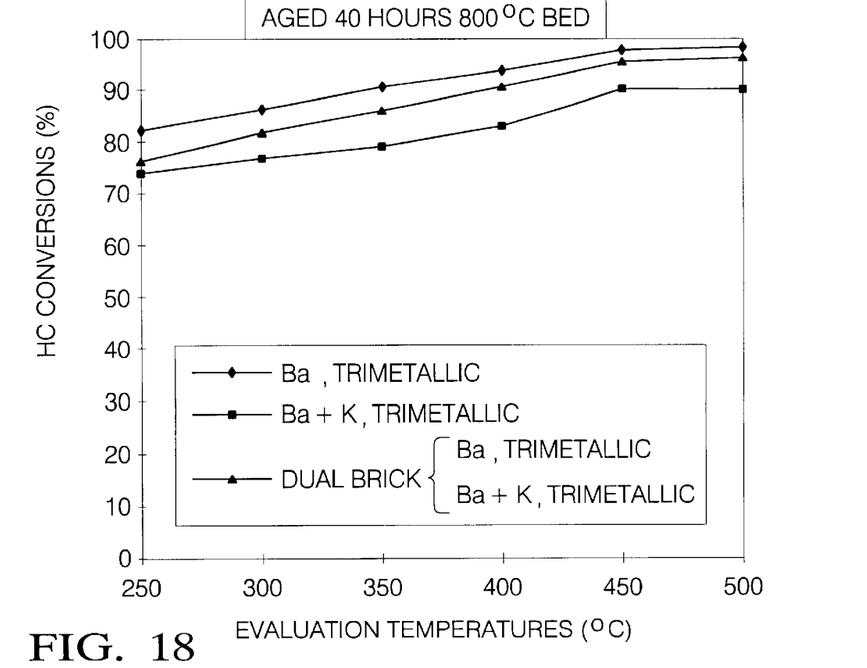
FIG. 18 is a graph showing HC conversion performance of an aged two-adsorber catalyst system including a first trimetallic adsorber catalyst containing Ba and a second trimetallic adsorber catalyst containing Ba and K, as compared to an aged single adsorber catalyst consisting of trimetallic $NO_x$ adsorber catalysts containing Ba alone, or Ba and K.
Figure 19:
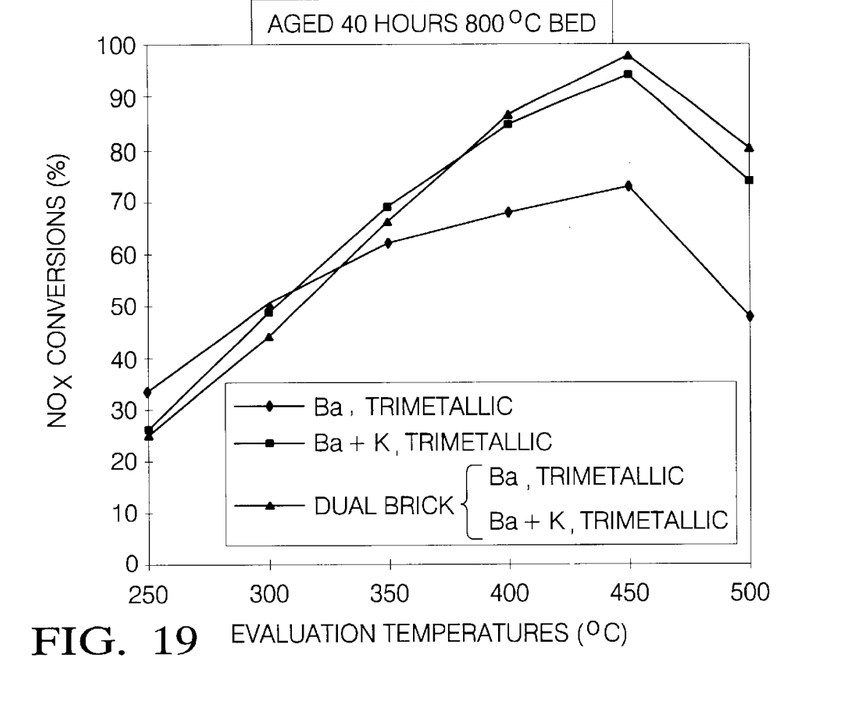
FIG. 19 is a graph showing $NO_x$ conversion performance of an aged two-adsorber catalyst system including a first trimetallic adsorber catalyst containing Ba and a second trimetallic adsorber catalyst containing Ba and K, as compared to an aged single adsorber catalyst consisting of trimetallic $NO_x$ adsorber catalysts containing Ba alone, or Ba and K.
Figure 20:
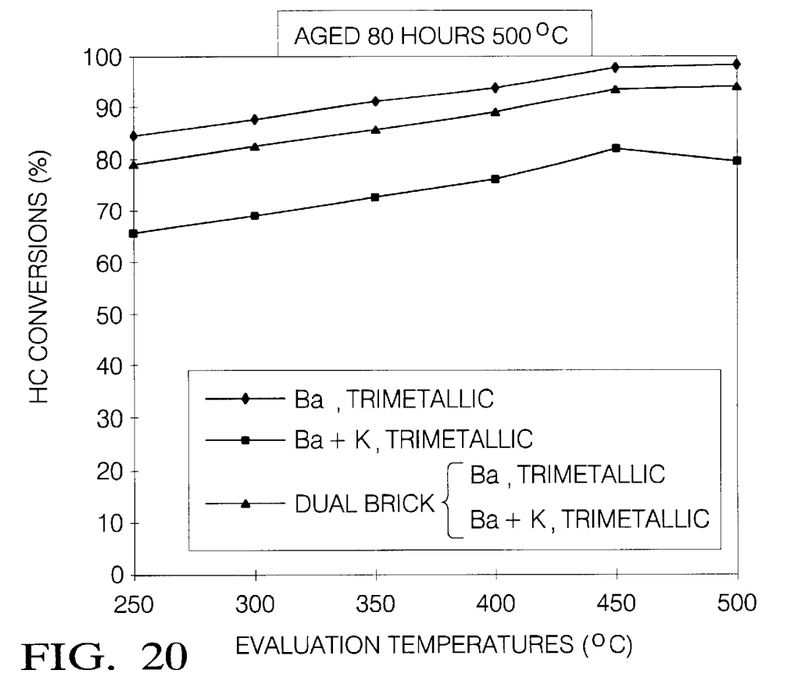
FIG. 20 is a graph showing HC conversion performance of a sulfur poisoned and desulfurized two-adsorber catalyst system including a first trimetallic adsorber catalyst containing Ba and a second trimetallic adsorber catalyst containing Ba and K, as compared to a low temperature aged single adsorber catalyst consisting of trimetallic $NO_x$ adsorber catalysts containing Ba alone, or Ba and K.
Figure 21:
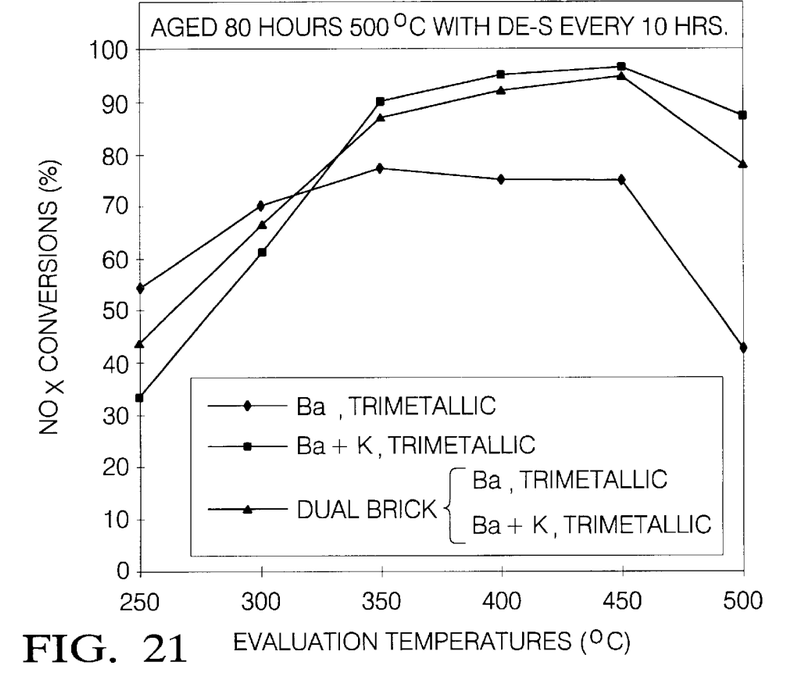
FIG. 21 is a graph showing $NO_x$ conversion performance of a sulfur poisoned and desulfurized two-adsorber catalyst system including a first trimetallic adsorber catalyst containing Ba and a second trimetallic adsorber catalyst containing Ba and K, as compared to an aged, desulfurized single adsorber catalyst consisting of a trimetallic adsorber catalyst containing Ba alone, or Ba and K.

Comparisons of performances of a two-adsorber catalyst system-consisting of a first adsorber having a Ba, trimetallic catalyst and a second adsorber having a Ba and K, trimetallic catalyst-with a single adsorber catalyst systems, having a Ba and K trimetallic catalyst and a Ba trimetallic catalyst respectively, shows that a two-adsorber system features the most balanced performance for HC, CO, $NO_x$ control, and stoichiometric light-off. The respective volumes of the two adsorbers in the dual catalyst system readily can be adjusted to tune the $NO_x$ operating window and HC conversion to desirable ranges. The two-adsorber system also features advantageous more facile S release than a Ba and K trimetallic catalyst; the Ba-only first adsorber acts as an S trap for the second K-containing catalyst, and Ba is easier to desulfurize than K. Further, the two-adsorber system consistently provides better HC conversion performance than a Ba and K trimetallic catalyst both fresh (FIG. 14) and after aging (FIGS. 16, 18, and 20). The two-adsorber system also provides better aged high temperature $NO_x$ adsorption performance than a Ba-only trimetallic catalyst, (FIGS. 19 and 21). The two-adsorber system is equivalent or better for $NO_x$ performance to a Ba and K trimetallic catalyst after aging (FIG. 17), even though inferior to a fresh Ba and K trimetallic catalyst (FIG. 15).

Two-brick system in practice is able to provide better $NO_x$ performance than a Ba and K trimetallic catalyst because of the potential for more efficient utilization of under-floor location volume. Compared to an alternative under-floor system arrangement containing a first $NO_x$ adsorber catalyst and a three-way catalyst in the rear, the dual $NO_x$ adsorber system features the advantage of higher $NO_x$ storage capacity.

For example, the dual catalyst system has been exemplified generally by embodiments wherein first and second catalyst substrates are utilized. The dual catalyst formulations, however, also can be on a single substrate, with the high temperature $NO_x$ absorbent component present only on the rear portion of the substrate.

While the invention has been described with reference to specific embodiments thereof, it is intended that all matter contained in the above description is shown in the accompanying drawings be interpreted as illustrative and not limiting in nature. Various modifications of the disclosed embodiments, as well as other embodiments of the invention, will be apparent to those skilled in the art upon reference to this description, or may be made without departing from the spirit and scope of the invention as defined in the amended claims.

What is claimed is:

1. A dual $NO_x$ absorber catalyst system for treatment of gases in an exhaust discharge passage of an internal combustion engine comprising:
    a first $NO_x$ adsorber catalyst formulation comprising effective amounts of at least one noble metal component and a Ba $NO_x$ adsorber component, the first catalyst formulation being K free; and,
    a second $NO_x$ adsorber catalyst formulation comprising effective amounts of at least one noble metal component, a Ba $NO_x$ adsorber component and an additional K $NO_x$ adsorber component.

2. The catalyst system of claim 1 wherein the first catalyst comprises effective amounts of at least two noble metals selected from the group consisting of Pt, Rh, and Pd.

3. The catalyst system of claim 2 wherein the second catalyst comprises effective amounts of at least two noble metals selected from the group consisting of Pt, Rh, and Pd.

4. The catalyst system of claim 3 wherein the second catalyst is located at a position downstream in the exhaust discharge passage from the first catalyst.

5. The catalyst system of claim 1 wherein the second catalyst comprises effective amounts of at least two noble metals selected from the group consisting of Pt, Rh, and Pd.

6. The catalyst system of claim 1 wherein the second catalyst is located at a position downstream in the exhaust discharge passage from the first catalyst.

7. The catalyst system of claim 1 wherein the first catalyst comprises effective amounts of Pt, Rh, and Pd.

8. The catalyst system of claim 7 wherein the first catalyst comprises a Ba component in an amount ranging from about 180 to about 2904 $g/ft^3$; a Pt component in an amount ranging from about 30 to about 150 $g/ft^3$; a Pd component in an amount ranging from about 10 to about 150 $g/ft^3$, and a Rh component in an amount ranging from about 3 to about 30 $g/ft^3$.

9. The catalyst system of claim 8 wherein the second catalyst is located at a position downstream in the exhaust discharge passage from the first catalyst.

10. The catalyst system of claim 7 wherein the second catalyst comprises effective amounts of Pt, Rh, and Pd.

11. The catalyst system of claim 10 wherein the second catalyst comprises a Ba component in an amount ranging from about 180 to about 2904 $g/ft^3$; a K component in an amount ranging from about 70 to about 1104 $g/ft^3$; a Pt component in an amount ranging from about 30 to about 150 $g/ft^3$; a Pd component in an amount ranging from about 10 to about 80 $g/ft^3$, and a Rh component in an amount ranging from about 3 to about 30 $g/ft^3$.

12. The catalyst system of claim 1, wherein the first adsorber catalyst and the second adsorber catalyst comprise equal amounts of Ba.

13. The catalyst system of claim 1, wherein the first adsorber catalyst and the second adsorber catalyst comprise equal amounts of Pt, Pd, and Rh.

14. The dual $NO_x$ adsorber catalyst system of claim 1 wherein the total amount of $NO_x$ adsorber component in the second $NO_x$ adsorber catalyst formulation is greater than the amount in the first $NO_x$ adsorber catalyst formulation.

15. A trimetallic adsorber catalyst system for treatment of gases in an exhaust discharge passage of an internal combustion engine comprising:
    a first adsorber catalyst supporting effective amounts of a trimetallic catalyst formulation of Pt, Rh, and Pd components and a Ba $NO_x$ adsorber component, the first adsorber catalyst being free from any additional $NO_x$ adsorber component; and,
    a second adsorber catalyst supporting effective amounts of a trimetallic catalyst formulation of Pt, Rh, and Pd components and a Ba component and an additional $NO_x$ adsorber component, the second adsorber catalyst located downstream in the exhaust discharge passage from the first adsorber catalyst.

16. The catalyst system of claim 15 wherein the first adsorber catalyst is supporting a Ba component in an amount ranging from about 363 to about 1452 $g/ft^3$; a Pt component in an amount ranging from about 50 to about 110 $g/ft^3$; a Pd component in an amount ranging from about 20 to about 80 $g/ft^3$, and a Rh component in an amount ranging from about 3 to about 15 $g/ft^3$; and the second adsorber catalyst is supporting a Ba component in an amount ranging from about 363 to about 1452 $g/ft^3$; a K component in an amount ranging from about 138 to about 552 $g/ft^3$; a Pt component in an amount ranging from about 50 to about 110 $g/ft^3$; a Pd component in an amount ranging from about 10 to about 50 $g/ft^3$, and a Rh component in an amount ranging from about 5 to about 15 $g/ft^3$.

17. The catalyst system of claim 15, wherein the first adsorber catalyst and the second adsorber catalyst comprise equal amounts of Ba.

18. The catalyst system of claim 15, wherein the first adsorber catalyst and the second adsorber catalyst comprise equal amounts of Pt, Pd, and Rh.

19. A dual $NO_x$ adsorber catalyst system for treatment of gases in an exhaust discharge passage of an internal combustion engine comprising:
    a first catalyst formulation comprising effective amounts of at least one noble metal component and a Ba component, the first catalyst formulation being K free; and a second catalyst formulation comprising effective amounts of at least one noble metal component, a Ba component, and an additional $NO_x$ adsorbent component.

20. The catalyst system of claim 19, wherein the first adsorber catalyst and the second adsorber catalyst comprise equal amounts of Ba.

21. The catalyst system of claim 19, wherein the first adsorber catalyst and the second adsorber catalyst comprise equal amounts of Pt, Pd, and Rh.

22. The catalyst system of claim 19, wherein the $NO_x$ adsorbent component is selected from a group of materials consisting of Na, Cs, and K.

23. The catalyst system of claim 19, wherein the first catalyst formulation comprises a Ba component in an amount ranging from about 180 g/ft$^3$ to about 2904 g/ft$^3$; a Pt component in an amount ranging from about 30 g/ft$^3$ to about 150 g/ft$^3$; a Pd component in an amount ranging from about 10 g/ft$^3$ to about 150 g/ft$^3$, and a Rh component in an amount ranging from about 3 g/ft$^3$ to about 30 g/ft$^3$.

24. The catalyst system of claim 19, wherein the second catalyst formulation comprises a Ba component in an amount ranging from about 180 g/ft$^3$ to about 2904 g/ft$^3$; a K component in an amount ranging from about 70 g/ft$^3$ to about 1104 g/ft$^3$; a Pt component in an amount ranging from about 30 g/ft$^3$ to about 150 g/ft$^3$; a Pd component in an amount ranging from about 10 g/ft$^3$ to about 80 g/ft$^3$, and a Rh component in an amount ranging from about 3 g/ft$^3$ to about 30 g/ft$^3$.

* * * * *